US011597657B2

(12) United States Patent
Baldi et al.

(10) Patent No.: US 11,597,657 B2
(45) Date of Patent: Mar. 7, 2023

(54) NITROGEN-DOPED TIO2 NANOPARTICLES AND THE USE THEREOF IN PHOTOCATALYSIS

(71) Applicant: COLOROBBIA CONSULTING S.r.l., Vinci (IT)

(72) Inventors: Giovanni Baldi, Montespertoli (IT); Laura Niccolai, Montelupo Fiorentino (IT); Marco Bitossi, Montelupo Fiorentino (IT); Valentina Dami, Larciano (IT); Andrea Cioni, Empoli (IT); Giada Lorenzi, Serravalle Pistoiese (IT)

(73) Assignee: COLOROBBIA CONSULTING S.R.L., Vinci (IT)

( * ) Notice: Subject to any disclaimer, the term of this patent is extended or adjusted under 35 U.S.C. 154(b) by 92 days.

(21) Appl. No.: 17/052,011

(22) PCT Filed: May 2, 2019

(86) PCT No.: PCT/IB2019/053592
§ 371 (c)(1),
(2) Date: Oct. 30, 2020

(87) PCT Pub. No.: WO2019/211787
PCT Pub. Date: Nov. 7, 2019

(65) Prior Publication Data
US 2021/0114893 A1    Apr. 22, 2021

(30) Foreign Application Priority Data
May 2, 2018   (IT) ................. 102018000004987

(51) Int. Cl.
*C01G 23/08*   (2006.01)
*B01J 21/06*   (2006.01)
(Continued)

(52) U.S. Cl.
CPC ............ *C01G 23/08* (2013.01); *B01J 21/063* (2013.01); *B01J 35/004* (2013.01); *C02F 1/32* (2013.01);
(Continued)

(58) Field of Classification Search
CPC .... B01D 43/00; B01D 39/2027; B01D 53/86; C01B 3/26; B01J 23/02
See application file for complete search history.

(56) References Cited

U.S. PATENT DOCUMENTS 6,627,336 B1 *   9/2003  Ohmori .................. B82Y 30/00
                                                     106/287.19

FOREIGN PATENT DOCUMENTS

CN          1736584         2/2006
CN      102716759 A    * 10/2012
(Continued)

OTHER PUBLICATIONS

Reddy et al., "Novel approach for the synthesis of nitrogen-doped titania with variable phase composition and enhanced production of hydrogen under solar irradiation", Journal of Industrial and Engineering Chemisty, 2017, vol. 53, pp. 253-260.
(Continued)

*Primary Examiner* — Cameron J Allen
(74) *Attorney, Agent, or Firm* — Wenderoth, Lind & Ponack, L.L.P.

(57) ABSTRACT

The invention relates to a photocatalyst that is active under irradiation with UV light, visible light and sunlight, comprising a powder or a ready-to-use nanometric suspension of nitrogen-doped $TiO_2$, wherein the brookite crystalline phase is also present and whose doping nitrogen content (% by weight) is sufficient to ensure photocatalytic activity in the visible region. The photocatalyst can be easily applied to substrates of varying nature.

20 Claims, 13 Drawing Sheets

(51) Int. Cl.
  *B01J 35/00*    (2006.01)
  *C02F 1/32*     (2023.01)
  *C02F 1/50*     (2023.01)
  *C02F 1/68*     (2023.01)
  *B82Y 30/00*    (2011.01)
  *B82Y 40/00*    (2011.01)

(52) U.S. Cl.
  CPC ............... *C02F 1/505* (2013.01); *C02F 1/68* (2013.01); *B82Y 30/00* (2013.01); *B82Y 40/00* (2013.01); *C01P 2002/54* (2013.01); *C02F 2303/04* (2013.01); *C02F 2305/08* (2013.01); *C02F 2305/10* (2013.01)

(56) References Cited

FOREIGN PATENT DOCUMENTS

WO    WO-2006067169 A1 *  6/2006  ............. B01J 21/06
WO    WO-2016192755 A1 *  12/2016

OTHER PUBLICATIONS

Lee et al., "Heterojunction-based two-dimensional N-doped $TiO_2$/$WO_3$ composite architectures for photocatalytic treatment of hazardous organic vapor", Journal of Hazardous Materials, 2016, vol. 314, pp. 22-31.
Pan et al., "Synthesis of nitrogen doped faceted titanium dioxide in pure brookite phase with enhanced visible light photoactivity", Journal of Colloid and Interface Science, 2016, vol. 469, pp. 25-30.
Wu et al., "Visible-light-induced photocatalytic inactivation of bacteria by composite photocatalysts of palladium oxide and nitrogen-doped titanium oxide", Applied Catalysis B: Environmental, 2009, vol. 88, No. 3-4, pp. 576-581.
International Search Report dated Aug. 5, 2019 in International (PCT) Patent Application No. PCT/IB2019/053592.
Written Opinion of the International Searching Authority dated Aug. 5, 2019 in International (PCT) Patent Application No. PCT/IB2019/053592.

* cited by examiner

NITROGEN-DOPED TIO2 NANOPARTICLES AND THE USE THEREOF IN PHOTOCATALYSIS

FIELD OF THE INVENTION

The present invention belongs to the field of photocatalytic degradation of polluting agents for water or air purification applications. In particular, the present invention relates to a product (and the process for the preparation thereof) comprising nitrogen-doped $TiO_2$ in the form of a powder or suspension of nanoparticles in a solvent. Said product is suitable for being used as an active photocatalyst not only when subjected to UV light irradiation, but also in the case of irradiation with visible light or sunlight.

BACKGROUND OF THE INVENTION

The use of light energy in processes of photodecomposition of chemical substances (such as, for example the abatement of pollutants in the liquid or gas phase, the production of hydrogen by water splitting, etc.) is presently one of the research fields of greatest interest from a scientific-technological viewpoint, as well as regards the investment of resources by the most industrialised countries. In this area a fundamental role is played by photocatalysts based on titanium dioxide ($TiO_2$), since the use of the latter has numerous advantages, including its low cost, high availability, nontoxicity, chemical and thermal stability and high oxidative power. However, the largest disadvantage of using titanium dioxide-based photocatalysts is that they are active only if irradiated by a suitable source of light having a wavelength in the interval of the ultraviolet region ($\lambda$=350-400 nm), due to the relatively large band gap energy of $TiO_2$ (Eg=3.0-3.2 eV), which absorbs light only with a wavelength smaller than about 387 nm. Sunlight is the most abundant, accessible and renewable source of photons available to us. About 50% of solar radiation is emitted in the infrared region (NIR, near visible), whilst the rest is emitted in the visible region and only 5% in the ultraviolet region. For this reason, many efforts have been dedicated with the aim of improving the photocatalytic performance of titanium dioxide toward the visible region and developing photocatalysts that are active under excitation with visible radiation, deriving both from the solar spectrum and from normal lamps for interior lighting, thus overcoming the high costs and problems of accessibility tied to the use of UV lamps.

Therefore, in order to solve the problem of the non-absorption of visible radiation, various strategies have been followed; these include modifying $TiO_2$ by introducing oxygen defects or doping with transition metals (such as Cu, Ni, Co, Mn, Fe, Cr, Mo, V and W), noble metals (such as Au, Ag and Pt), rare earth elements and, only recently, non-metals (for example C, N, P, S, F etc.). In particular, doping with nitrogen is one of the most effective approaches for improving $TiO_2$ activity in the visible region.

Starting from one of the first examples of nitrogen-doped $TiO_2$ with photocatalytic sensitisation in the visible region, reported in a 1986 article by Sato (S. Sato, Chem. Phys. Lett. 123 (1986) 126-128), numerous studies have appeared on the method of preparation and characterisation of this material.

Among the various "wet-chemistry" methods of preparing $TiO_2$—N known in the prior art, it is possible to identify processes in which the doping takes place simultaneously with the synthesis of titanium dioxide through the addition of a nitrogen source to the suspension containing the precursor of $TiO_2$, like in the article by Livraghi (S. Livraghi et. al., Journal of Solid State Chemistry 182 (2009) 160-164) for example, or processes that start off from an already formed colloidal solution of $TiO_2$, to which the nitrogen source is added in a second step (CN 1736584). In this case the final product is obtained in the form of a nano-$TiO_2$—N powder (anatase) following a drying process and subsequent calcination at 300-650° C. for 0.5-6 h.

Moreover, in the literature it is known that, in general, the photocatalytic activity of $TiO_2$ can be influenced by other factors such as the crystalline structure, particle sizes, surface morphology and porosity.

Among these factors, the crystalline structure is the factor that most influences the photocatalytic performance.

Titanium dioxide is a material that exhibits polymorphism, i.e. it exists in more than one crystalline structure. There are four commonly known crystalline phases of $TiO_2$: anatase (tetragonal), rutile (tetragonal), brookite (orthorhombic) and $TiO_2$ (B) (monoclinic).

Among the two most common crystalline phases of $TiO_2$, anatase and rutile (which is also the most thermodynamically stable phase), in the present state of the art anatase appears to be the phase with the greatest photo-activity. For this reason, most research on $TiO_2$-based photocatalysts has focused on anatase, rutile or biphasic compositions thereof.

The brookite phase, by contrast, has received less attention. It is important to note that this lack of interest is due not to the photocatalytic activity of brookite (which is actually very active from a photocatalytic viewpoint), but rather to its thermodynamic metastability and the difficulty of obtaining it in high percentages.

A photocatalyst based on nitrogen-doped $TiO_2$ is described in patent EP 2000208 A2. In this document mention is made of the possibility of obtaining a product comprising $TiO_2$ in any of the crystalline forms, anatase, rutile or brookite, or in a mixed crystalline form comprising two or more of the aforesaid crystalline phases. However, the final photocatalyst shows a limitation in the content of doping nitrogen, which must remain below 0.1% by weight in order to avoid impairing the photocatalytic activity of the product in the visible region.

In this context, the technical task at the basis of the present invention is to propose an optimised alternative to the existing $TiO_2$—N-based photocatalysts which has the same effectiveness or a greater effectiveness and can be adapted to cover different substrates that are not necessarily resistant to high temperatures (thus to calcination), a problem that is present in the current state of the art with many similar products comprising $TiO_2$—N. Said technical problem is overcome by the present invention, which provides a photocatalyst (and a process for the preparation thereof) which comprises a powder or a stable suspension of nitrogen-doped $TiO_2$ nanoparticles with photocatalytic activity both in the UV region and in the visible region, wherein the brookite crystalline phase is present and whose nitrogen content is sufficient to ensure the absorption of visible light. The photocatalyst can be easily applied to a variety of different substrates by means of known industrial systems, in particular also to substrates that are not resistant to high temperatures.

SUMMARY OF THE INVENTION

The present invention relates to a photocatalyst that is active under irradiation with UV light, visible light and sunlight, comprising a powder or a ready-to-use nanometric suspension of nitrogen-doped $TiO_2$ ($TiO_2$—N), wherein the $TiO_2$—N is also present in the brookite crystalline phase and whose nitrogen content (% by weight) is sufficient to ensure the photocatalytic activity in the visible region. In one embodiment, the $TiO_2$—N nanoparticles in suspension (or the $TiO_2$—N powder) comprise at least two crystalline phases: a brookite crystalline phase and a rutile crystalline phase or an anatase crystalline phase. In another embodiment, the $TiO_2$—N nanoparticles in suspension comprise three crystalline phases: a brookite crystalline phase, an anatase phase and a rutile phase.

The present invention also relates to the use of the photocatalyst for coating applications on substrates of a different nature, both resistant and not resistant to high temperature, such as, for example: glass, ceramics, metal, fabrics and various plastic materials, including PMMA (polymethylmethacrylate), PA (polyamide), PC (polycarbonate), PLA (polylactic acid), PET (polyethylene terephthalate), PE (polyethylene), PVC (polyvinyl chloride), PS (polystyrene) and the like.

The invention also relates to a process for preparing the product of the invention which uses as a precursor an aqueous suspension of $TiO_2$ nanoparticles, preferably in the anatase crystalline form, to which a nitrogen source is added. The suspension obtained is subjected to a drying process and subsequent calcination in order to obtain the doping with nitrogen.

The calcination step may optionally be followed by a grinding step in order to re-disperse the powder obtained in a solvent and subsequently a step of further dilution in a solvent in order to prepare a ready-to-use nanometric suspension of nitrogen-doped $TiO_2$ as a photocatalyst.

DETAILED DESCRIPTION OF THE INVENTION

Figure 1:
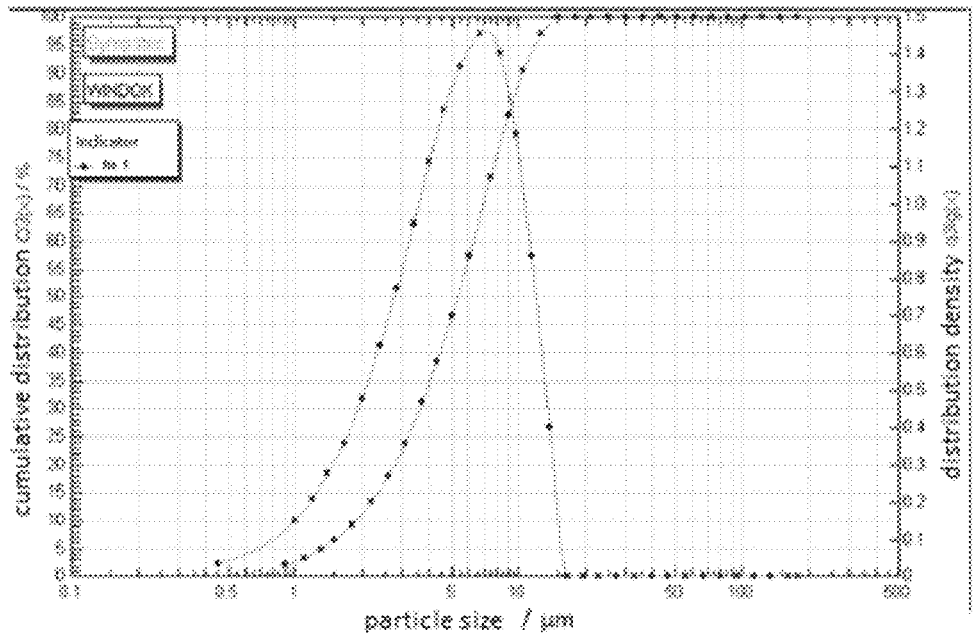
FIG. 1: Particle size analysis of the powder sample (before calcination) of example 2, carried out with Sympatec HELOS dry dispersion laser (H0969)

For the purposes of the present invention, the definitions: "suspension of nanoparticles" and "nanoparticle suspension", are considered synonyms and refer to a mixture in which finely subdivided solid nanoparticles are dispersed in a solvent, for example water and/or alcohol, in such a way as not to sediment in a short time.

The present invention relates to a process for preparing a suspension of nitrogen-doped $TiO_2$ nanoparticles ($TiO_2$—N) which comprises the steps of:

a) preparing a suspension of $TiO_2$ nanoparticles in water;
b) adding a nitrogen-containing doping agent to the suspension and mixing until homogeneous;
c) drying the suspension to which the nitrogen-containing doping agent was added until obtaining a powder with an aqueous residue comprised between 0 and 15% by weight;
d) subjecting the dried powder to calcination at a temperature comprised between 400 and 600° C., thereby obtaining a calcined powder;
e) subjecting the calcined powder to grinding in a solvent, thereby obtaining a suspension of $TiO_2$—N nanoparticles in solvent;
f) diluting the suspension of step e) with additional solvent.

The suspension of $TiO_2$ nanoparticles in water of step a) is a stable suspension prepared according to the process described in WO200788151 of the same applicant, entirely incorporated herein by reference.

In particular, the suspension of $TiO_2$ nanoparticles in water of step a) is a suspension of $TiO_2$ nanoparticles in the anatase crystalline form.

The $TiO_2$ nanoparticles in suspension have a size comprised between 30 and 50 nm measured with methods known in the art, such as FEG-SEM (scanning electron microscopy), TEM (transmission electron microscopy) and DLS (dynamic light scattering). The polydispersity index of the nanoparticles is less than 0.3, preferably comprised between 0.21 and 0.29, more preferably between 0.216 and 0.286.

The concentration of $TiO_2$ nanoparticles suspended in water is comprised between 1 and 10% by weight, preferably between 2 and 8% by weight.

The suspension of nanoparticles is stable for very prolonged periods without manifesting phenomena of coagulation or conglomeration. Therefore, such suspension can be prepared with the process of WO200788151 and then stored, also for a long time, before being used as a starting product for the process according to the present invention.

The process for obtaining the suspension of $TiO_2$ nanoparticles in water, preferably in the anatase crystalline form, comprises a first step wherein a titanium alkoxide in water is subjected to acidic hydrolysis at a temperature comprised between 15 and 95° C. and for a time comprised between 12 hours and 72 hours, in the presence of a non-ionic surfactant, preferably Triton X-100.

The titanium alkoxide is selected from among titanium methoxide, titanium ethoxide, titanium normal-propoxide, titanium isopropoxide, titanium normal-butoxide and titanium isobutoxide. The preferred alcoxide is titanium propoxide.

The mineral acid used for the acidic hydrolysis of the titanium alcoxide is selected from among: hydrochloric acid, nitric acid, sulphuric acid, perchloric acid, hydrobromic acid and hydrogen iodide.

In step b) a nitrogen-containing doping agent selected from an inorganic ammonium salt and a nitrogenous organic compound is added to the suspension of $TiO_2$ nanoparticles in water, preferably in the anatase crystalline form. The nitrogen-containing doping agent is preferably selected from ammonium citrate and triethanolamine. Ammonium citrate has provided better results than triethanolamine in terms of process and ease of drying of the suspension and is therefore the preferred nitrogen-containing doping agent for the purposes of the present invention.

The nitrogen-containing doping agent is added to the aqueous suspension of $TiO_2$ nanoparticles in an amount comprised between 2 and 6% by weight, preferably between 3 and 5% by weight.

The addition of the nitrogen-containing doping agent to the aqueous suspension of $TiO_2$ nanoparticles takes place under stirring and the formation of a white gel is observed.

The suspension is then kept under stirring for a time comprised between 4 and 24 hours, i.e. until obtaining a homogeneous white suspension.

The suspension obtained comprises from 4 to 8% by weight of $TiO_2$ and 6 to 30% by weight of nitrogen relative to the weight of $TiO_2$. The suspension preferably comprises from 5 to 7% by weight of $TiO_2$ and from 8 to 25% by weight of nitrogen relative to the weight of $TiO_2$.

The suspension obtained comprises $TiO_2$ nanoparticles having a size comprised between 48 and 150 nm, measured as the Z-average with DLS (dynamic light scattering, Malvern Instruments). The 48-150 nm range means that the nanoparticles have a Z-average equal to a whole or decimal number comprised between 48 and 150 nm, with a polydispersity index of less than 0.3, preferably comprised between 0.21 and 0.29, more preferably between 0.216 and 0.286. Such polydispersity values indicate an excellent size uniformity of the nanoparticles of the suspension. Therefore, if, for example, the Z-average value of the nanoparticles is equal to 49.9 with a polydispersity index of 0.221, this means that the suspension comprises very uniform nanoparticles, nearly all of which have a diameter of around 49.9 nm.

The suspension of $TiO_2$ nanoparticles thus obtained is subjected to drying in step c) by means of the spray-drying technique, gas or electric ovens, or by heating with microwaves. The latter treatment is to be preferred, since the process is more efficient and faster compared to the use of the conventional spray-drying technique; moreover, the treatment with microwaves makes it possible to obtain a powder with a smaller degree of aggregation/agglomeration, which renders the subsequent grinding step (step e) more efficient.

The drying temperature is comprised between 100 and 150° C., preferably between 110 and 140° C. Drying can last from 10 to 24 hours, preferably from 15 to 20 hours.

At the end of drying a very fine powder is obtained, with a water residue comprised between 0 and 15% by weight and good flowability.

The particle size of the powder is less than 20 μm, preferably less than 15 μm, as calculated by laser diffraction using a Sympatec Model HELOS Laser (H0969). Preferably, 99% of the powder particles have a particle size of less than 15 μm and 90% of the powder particles have a particle size of less than 11 μm. More preferably, 50% of the powder particles have a particle size of less than 5.5 μm and 10% of the powder particles have a particle size of less than 2 μm.

The calcination of step d) preferably takes place at a temperature comprised between 450 and 500° C.

Heating is carried out by treating the dried powder in a muffle furnace or by means of microwaves. The latter treatment is to be preferred, since the process is more efficient and faster than when conventional heating in a muffle furnace is used; moreover, the microwave treatment makes it possible to obtain a powder with a smaller degree of aggregation/agglomeration, which renders the subsequent grinding step (step e) more efficient.

The calcination is carried out for a time comprised between 1 and 2 hours, preferably with a 1 or 2 hour ramp in order to arrive at the calcination temperature. The heating gradient can be comprised between 7 and 14° C. per minute.

During the calcination step, the $TiO_2$ is doped with nitrogen, which penetrates into the $TiO_2$ nanoparticles, positioning itself in a substitution position within the crystal lattice of $TiO_2$ and/or in a interstitial position, that is, within the crystal planes of $TiO_2$.

The calcined powder appears as an aggregate powder of nitrogen-doped $TiO_2$ ($TiO_2$—N) which, as revealed by an X-ray diffraction analysis, has at least a brookite crystalline phase in an amount of 10 to 99% by weight relative to the weight of the calcined powder.

In one embodiment, said calcined powder further comprises a rutile crystalline phase.

In one embodiment, the calcined powder comprising at least a brookite crystalline phase and a rutile crystalline phase, also further comprises an anatase crystalline phase.

In one embodiment, the calcined powder comprises from 90 to 99% by weight of the brookite crystalline phase of $TiO_2$ relative to the weight of the calcined powder, the remaining amount to 100% being the rutile and/or anatase crystalline phase.

In one embodiment, the calcined powder of $TiO_2$—N comprises at least two crystalline phases of $TiO_2$: a brookite crystalline phase in an amount of 10 to 99% by weight relative to the weight of the calcined powder and a rutile crystalline phase (or else an anatase crystalline phase) in an amount of 25 to 90% by weight relative to the weight of the calcined powder.

In one embodiment, the calcined powder of $TiO_2$—N comprises at least two crystalline phases of $TiO_2$: a brookite crystalline phase in an amount of 10 to 75% by weight relative to the weight of the calcined powder and a rutile crystalline phase (or else an anatase crystalline phase) in an amount of 25 to 90% by weight relative to the weight of the calcined powder.

In one embodiment, the calcined powder comprises a rutile crystalline phase (or else an anatase crystalline phase) and a brookite crystalline phase, each preferably present in an amount equal to about 50% by weight relative to the weight of the calcined powder.

In one embodiment, the calcined powder comprises three crystalline phases of $TiO_2$: a brookite crystalline phase in an amount of 20 to 75%, an anatase crystalline phase in an amount of 35 to 80% by weight relative to the weight of the calcined powder and a rutile crystalline phase in an amount of 35 to 40% by weight relative to the weight of the calcined powder.

The calcined powder has a degree of purity greater than 95% by weight, preferably equal to or greater than 99% by weight, since the diffraction analysis did not reveal the presence of phases other than the crystalline phases of $TiO_2$ described above.

Without being bound to any theory, the applicant believes that the formation of a calcined powder of doped $TiO_2$ comprising at least a brookite crystalline phase is mainly attributable to the use of the suspension of $TiO_2$ obtained with the process of WO200788151, but probably also to a combination between the use of this starting product and the drying and calcination steps as just described.

The presence of the brookite phase is a surprising and unexpected result considering that the starting product consists essentially of $TiO_2$ in the anatase phase. The brookite phase brings considerable advantages as regards the photocatalytic properties of the final suspension obtained at the end of the process.

The process of the invention thus makes it possible to obtain $TiO_2$—N in a nanoparticle form which exhibits photocatalytic properties that are comparable or even superior to those of the $TiO_2$—N-based photocatalysts known in the art, thanks to the formation of the brookite crystalline phase in a substantial amount.

Another surprising result is tied to the observation that, as will be better explained further below in this description, the suspension of $TiO_2$—N obtained at the end of the process of the invention proves to be stable for over 6 months, despite the presence of a substantial amount of the brookite crystalline phase, which, as is known in the literature, is the least stable crystalline phase of $TiO_2$.

Moreover, the amount of doping nitrogen present in the $TiO_2$ is comprised between 1 and 5% by weight, preferably between 1.5 and 3% by weight. That amount is much larger than the amount envisaged by EP 2000208 A2, which mentions the possibility of obtaining $TiO_2$—N comprising a mixture of the brookite and anatase phases—with a preference, however, for the anatase phase, considered to perform better from a catalytic viewpoint—wherein the amount of doping nitrogen must be less than 0.1% by weight.

The calcined powder can be marketed as such, as a semi-finished product that must be subsequently processed by the purchaser in order for it to be further used as a photocatalyst.

Therefore, a further subject matter of the invention is a process for obtaining the calcined powder which comprises steps a) to d) as just described. Said process can also be defined as a process for obtaining a semi-finished calcined powder.

Alternatively, according to the process of the present invention, the aggregate calcined powder can be subjected to grinding in a solvent, preferably in an organic solvent or water, in order to disaggregate it and resuspend it in the solvent (steps e) and f) of the process).

In step e) of the process of the invention, the calcined powder is subjected to grinding in a high energy ball mill with the aid of a solvent, for example water, acetone, ethyl alcohol or mixtures thereof.

The grinding takes place at a speed comprised between 1000 and 2000 rpm for a time comprised between 30 and 120 minutes, preferably between 80 and 100 minutes.

At the end of grinding a very concentrated suspension in solvent is obtained, with concentration values of the $TiO_2$—N nanoparticles comprised, for example, between and 30% by weight. In particular, the suspension obtained after grinding is a suspension of $TiO_2$—N nanoparticles in an organic solvent, for example ethyl alcohol or acetone or mixtures thereof, or else in water, or in mixtures of water and organic solvent.

The size of the nanoparticles is comprised between 48 and 150 nm, measured as a Z-average with DLS (dynamic light scattering, Malvern Instruments). The 48-150 nm range means that the nanoparticles have a Z-average equal to a whole or decimal number comprised between 48 and 150 nm, with a polydispersity index of less than 0.3, preferably comprised between 0.21 and 0.29, more preferably between 0.216 and 0.286. Such polydispersity values indicate an excellent size uniformity of the nanoparticles of the suspension. Therefore, if, for example, the Z-average value of the nanoparticles is equal to 49.9 with a polydispersity index of 0.221, this means that the suspension comprises very uniform nanoparticles, nearly all of which have a diameter of around 49.9 nm.

The suspension obtained at the end of step e) can be too concentrated and have a rheology that is not suitable for some industrial applications, above all for applications on a substrate.

For this reason, the process of the invention also comprises a subsequent step f), wherein the suspension is further diluted in the same solvent, preferably in an organic solvent or water or mixtures thereof, such as, for example, ethyl alcohol, acetone, water or mixtures thereof. The final concentration of the $TiO_2$—N powder in the solvent is thus brought to values comprised between 0.1 and 20% by weight, preferably between 1 and 10% by weight.

For applications on a substrate, in particular, the rheology of the suspension must preferably be characterised by a density comprised between 0.6 and 1 $g/cm^3$, more preferably between 0.7 and 0.9 $g/cm^3$, and a viscosity comprised between 0.8 and 1.3 mPa·s, more preferably between 0.9 and 1.1 mPa·s, measured at 25° C.

If a suspension with these rheological characteristics is not obtained from the grinding and subsequent dilution, it will be possible to modulate the density and viscosity by adding suitable additives known in the art for this type of function, for example carboxymethylcellulose and glycols.

The rheology of the suspension is important in order to be able to use the suspension on an industrial level, in particular in order to be able to apply the suspension to substrates of a different nature using the spray coating, flow coating, dip coating, spin coating, Meyer bar coating, gravure coating, knife coating, kiss coating, die coating or film transfer techniques.

In one embodiment of the invention, during step f) of diluting the suspension, it is possible to add to the suspension of $TiO_2$—N nanoparticles one or more biocidal agents, such as, for example, a source of silver (in the form of a silver salt, e.g. a silver nitrate or sulphate, or silver nanoparticles), zinc oxide nanoparticles, a source of copper (in the form of a copper salt, e.g. a copper nitrate or sulphate, or copper nanoparticles) or a mixture thereof. In this manner one obtains a suspension in solvent that has antibacterial activity, due to the presence of the silver and/or zinc oxide and/or copper, even when not irradiated by UV light, visible light or sunlight. In this embodiment, the amount of silver and/or ZnO and/or Cu present in the final suspension is greater than 20 ppm.

The suspension of $TiO_2$—N nanoparticles obtained at the end of the process of the invention comprises nanoparticles with the same crystalline phases as observed in the calcined powder.

The percentages by weight specified here below are to be understood as percentages by weight of the crystalline phase relative to the weight of the nanoparticles.

A further subject matter of the present invention is a suspension of $TiO_2$—N nanoparticles in an organic and/or aqueous solvent, wherein the nanoparticles comprise at least a brookite crystalline phase in an amount of 10 to 99% by weight relative to the weight of the nanoparticles.

In one embodiment, said $TiO_2$—N nanoparticles in suspension further comprise a rutile crystalline phase.

In one embodiment, the $TiO_2$—N nanoparticles in suspension comprising at least a brookite crystalline phase and a rutile crystalline phase further comprise an anatase crystalline phase.

In one embodiment, the $TiO_2$—N nanoparticles in suspension comprise from 90 to 99% by weight of the $TiO_2$ brookite crystalline phase relative to the weight of the nanoparticles, the remaining amount to 100% being the rutile and/or anatase crystalline phase.

In one embodiment, the $TiO_2$—N nanoparticles in suspension comprise at least two crystalline phases of $TiO_2$: a brookite crystalline phase in an amount of 10 to 99% by weight relative to the weight of the nanoparticles and a rutile or anatase crystalline phase in an amount of 25 to 90% by weight relative to the weight of the nanoparticles.

In one embodiment, the $TiO_2$—N nanoparticles in suspension comprise at least two crystalline phases of $TiO_2$: a brookite crystalline phase in an amount of 10 to 75% by weight relative to the weight of the nanoparticles and a rutile or anatase crystalline phase in an amount of 25 to 90% by weight relative to the weight of the nanoparticles.

In one embodiment, the $TiO_2$—N nanoparticles in suspension comprise a rutile crystalline phase (or an anatase crystalline phase) and a brookite crystalline phase, preferably each present in an amount equal to about 50% by weight relative to the weight of the nanoparticles.

In one embodiment, the $TiO_2$—N nanoparticles in suspension comprise three crystalline phases of $TiO_2$: a brookite crystalline phase in an amount of 20 to 75% by weight relative to the weight of nanoparticles, an anatase crystalline phase in an amount of 35 to 80% by weight relative to the weight of the nanoparticles and a rutile crystalline phase in an amount of 35 to 40% by weight relative to the weight of the nanoparticles.

The suspension of $TiO_2$—N nanoparticles is a suspension in a solvent, preferably ethyl alcohol, acetone, water or mixtures thereof.

The nanoparticles are present in suspension in an amount comprised between 0.1 and 20% by weight, preferably between 1 and 10% by weight, preferably in an organic alcoholic solvent, water or mixtures thereof, such as, for example ethyl alcohol or mixtures of the latter with water. The solvent is thus present in an amount comprised between 80 and 99.9% by weight.

The $TiO_2$—N nanoparticles in suspension have a doping nitrogen content comprised between 1 and 5% by weight, preferably between 1.5 and 3% by weight relative to the weight of the nanoparticles.

The suspension has a density comprised between 0.6 and 1 $g/cm^3$, more preferably between 0.7 and 0.9 $g/cm^3$, and a viscosity comprised between 0.8 and 1.3 mPa·s, more preferably between 0.9 and 1.1 mPa·s, measured at 25° C.

The suspension comprises $TiO_2$—N nanoparticles having a size comprised between 48 and 150 nm, as defined above.

In one embodiment, the suspension of $TiO_2$—N nanoparticles also comprises one or more biocidal agents such as, for example a source of silver (a silver salt or silver nanoparticles), zinc oxide nanoparticles, a source of copper (a copper salt or copper nanoparticles) or a mixture thereof, dispersed in the solvent, as described above.

Therefore, the process of the invention as detailed above can also be defined as a process for obtaining a suspension of $TiO_2$—N nanoparticles having the characteristics of a composition of crystalline phases as defined above. Moreover, the process can be defined as a process for obtaining a suspension of $TiO_2$—N nanoparticles having the physicochemical characteristics listed above (considered individually or in combination).

The suspension of $TiO_2$—N nanoparticles can be defined as a ready-to-use suspension, since it has physicochemical characteristics such as, for example, its rheology, which enable it to be used, without further treatments, for coating substrates by means of the coating techniques listed above. Moreover, the suspension thus obtained is stable for over 6 months without the formation of precipitates or phase separations.

The suspension exhibits photocatalytic properties, when irradiated with UV light, visible light or sunlight, which are comparable or even superior to those of the $TiO_2$—N nanoparticles known in the art, thanks precisely to the presence of the brookite crystalline phase, which increases the photocatalytic potential of $TiO_2$—N.

Without wishing to be bound to any theory, the better photocatalytic activity of the brookite phase as compared to the other two crystalline phases can be linked to the fact that, since the surface photocatalytic activity depends on the number of $TiO_2$ molecules per unit cell, the brookite phase, having a larger cell volume, also has a greater amount of surface oxygen available for photocatalysis.

The photocatalytic activity of the suspension of $TiO_2$—N nanoparticles of the invention is an oxidative photocatalytic activity, since under irradiation by UV light, visible light or sunlight, the doped nanoparticles become a potent oxidant of many organic substances present in the air or water, such as, for example, $NO_x$, VOCs (volatile organic compounds) and VOSs (volatile organic solvents), bacteria, moulds or odours—these being prevalently composed of organic substances and bacteria—thus contributing to the abatement thereof and as a consequence to air or water purification.

In consideration of the excellent photocatalytic properties of the suspension of the invention, a subject matter of the patent is also the use of the suspension of $TiO_2$—N nanoparticles according to the invention as an active photocatalyst when irradiated with UV light, visible light or sunlight, in particular as an oxidative photocatalyst for oxidising organic contaminants, such as, for example $NO_x$, VOCs and VOSs, bacteria, moulds or odours present in the air or water.

In particular, the invention relates to the use of the $TiO_2$—N nanoparticles having the crystalline phase characteristics and other properties listed above as photocatalysts when irradiated with UV light, visible light or sunlight.

As mentioned previously, the calcined powder obtained after step d) also have excellent photocatalytic properties and can be marketed as a semi-finished product for applications similar to those of the suspension, i.e. to be used as a photocatalyst, in particular as an oxidative photocatalyst for oxidising organic contaminants, such as, for example $NO_x$, VOCs and VOSs, bacteria, moulds or odours present in the air or water.

The semi-finished calcined powder will have to be treated beforehand by the purchaser in order for it to be further used as a photocatalyst, for example, it will have to be subjected to wet grinding and then re-dispersed in solvent, according to steps e) and f) of the process described herein. Alternatively, the calcined powder can be finely dispersed, with or without a grinding and dilution pre-treatment according to steps e) and f), in dyes and paints used to coat floors, walls or exterior surfaces of buildings in order to render them photocatalytic and thus capable of decontaminating the environments from organic pollutants, such as, for example, $NO_x$, VOCs and VOSs, bacteria, moulds or odours and cooperating in maintaining a superior air quality. This application is particularly recommended for coating the walls and floors of work and/or home environments, which are often polluted by bacteria, moulds, odours, volatile organic solvents and compounds (VOSs/VOCs), deriving, for example, from the paints on furniture, and/or formaldehyde, a substance that is likewise released by finishing treatments for furniture and cladding panels. This application can further act on the abatement of bacterial contamination present in both indoor and outdoor environments.

Alternatively, the calcined powder could be used as such in numerous industrial applications, such as, for example, for use as an odour absorber, in water treatment kits and in breathing masks.

The invention also relates to the use of the suspension or calcined powder of $TiO_2$—N nanoparticles, or of the $TiO_2$—N nanoparticles, to purify air or water from organic pollutants that can be oxidised by photocatalysis, i.e. by irradiation of the suspension with UV light, visible light or sunlight.

In particular, the invention relates to the use of the suspension of $TiO_2$—N nanoparticles to coat substrates of a varying chemical nature using techniques known in the art, such as spray coating, flow coating, dip coating, spin coating, Meyer bar coating, gravure coating, knife coating, kiss coating, die coating or film transfer. Such substrates are preferably plastic, fabric, nonwoven, metal, glass or ceramic substrates.

The substrates that can be coated with the suspension of the invention are selected from among: glass, ceramics (for example cordierite, mullite, alumina), metal, fabric material, nonwoven fabric material, paper, cardboard and plastic materials. The plastic materials are preferably selected from among: PMMA (polymethylmethacrylate), PA (polyamide), PC (polycarbonate), PLA (polylactic acid), PET (polyethylene terephthalate), PE (polyethylene), PVC (polyvinyl chloride) and PS (polystyrene).

The application to the substrate using the techniques just listed takes place at room temperature and it is therefore possible to apply the coating also to those substrates that are sensitive to high temperatures, such as, for example substrates made of plastic, fabric or nonwoven fabric material.

A further subject matter of the invention is a dye or paint comprising the $TiO_2$—N powder and/or suspension of the invention, as well as the use of said dye or paint to coat interior or exterior surfaces for the purpose of rendering them photocatalytic and thus capable of decontaminating environments from organic pollutants, such as, for example $NO_x$, VOCs and VOSs, bacteria, moulds or odours. The invention further relates to the surface coated with said dye or paint.

A further subject matter of the invention is a substrate coated with the suspension of nanoparticles, wherein said substrate consists of any one of the materials listed above. After application of the suspension of the invention, the substrate will be coated with $TiO_2$—N nanoparticles having the characteristics indicated in the invention. The substrate is preferably made of plastic material selected from among PMMA (polymethylmethacrylate), PA (polyamide), PC (polycarbonate), PLA (polylactic acid), PET (polyethylene terephthalate), PE (polyethylene), PVC (polyvinyl chloride) and PS (polystyrene).

The substrate can be for example an air or water filter coated with the suspension of the invention and inserted into a device that also comprises a source of visible and/or UV light. Said device can be a device for abating air or water polluting agents, or a lighting system. The filter coated with the suspension of the invention is activated by irradiation with visible or UV light when the device is switched on. Irradiation with visible or UV light triggers the activation of the photocatalytic properties of the $TiO_2$—N nanoparticles of the invention, thus bringing about the oxidation of organic contaminants of the air (e.g. $NO_x$, VOCs and VOSs, bacteria, moulds or odours)—or water—and contributing in fact to the decontamination of the environment.

In one embodiment, wherein the suspension of $TiO_2$—N also contains one or more biocidal agents, preferably selected from among silver (in the form of salts or nanoparticles) and/or ZnO and/or copper (in the form of salts or nanoparticles), the device will retain antibacterial (and thus air or water purifying) properties even when the light source is switched off.

In a particularly preferred embodiment, the substrate or filter comprises an application surface for the application of the suspension of $TiO_2$—N nanoparticles comprising a matrix of thin ceramic walls which define a plurality of parallel conduits, open at both ends, so as to permit the passage of a gaseous mixture (air).

In other words, the application surface has a honeycomb structure which comprises a plurality of conduits, each of which is coated with the $TiO_2$—N nanoparticles, thereby defining a plurality of oxidation sites in which, via the activation of the photocatalytic properties of the $TiO_2$—N nanoparticles by an incident photon, the environmental pollutants are adsorbed and degraded, resulting in a purification of the gaseous mixture, in particular air (or water), passing through the conduits of the application surface.

For example, nitrogen oxides undergo degradation to nitrates, whereas other organic air contaminating substances (bacteria, moulds, odours, VOCs and VOSs for example) are oxidised, thus forming carbon residues and/or carbon dioxide.

The by-products resulting from the air filtration can be easily washed off the application surface, thus completely restoring its functionality.

In a further aspect, the invention also relates to a device which comprises a source of visible and/or UV light and a substrate or filter coated with the $TiO_2$—N nanoparticles deriving from the suspension of the invention. The device can be a device for abating air or water polluting agents, or a lighting system.

In one embodiment, the device itself can be entirely or partially coated with the $TiO_2$—N nanoparticles deriving from the suspension of the invention using the spray coating, flow coating, dip coating, spin coating, Meyer bar coating, gravure coating, knife coating, kiss coating, die coating or film transfer application techniques.

"Entirely coated" means that the device has all its inner and outer surfaces coated with the $TiO_2$—N nanoparticles deriving from the suspension of the invention. In other words, the inner and outer surfaces of the device have an overall coating percentage greater than 95%, preferably greater than 98%.

"Partially coated" means that the inner and outer surfaces of the device have an overall coating percentage of less than 99%, preferably less than 95%. In this case, for example, only some of the surfaces of the various components of the device may be coated with the $TiO_2$—N nanoparticles of the invention.

The device is preferably made entirely or partially (i.e. only some of the components of the device) of a plastic material selected from among PMMA (polymethylmethacrylate), PA (polyamide), PC (polycarbonate), PLA (polylactic acid), PET (polyethylene terephthalate), PE (polyethylene), PVC (polyvinyl chloride) and PS (polystyrene).

In one embodiment, the device is totally or partially coated with the $TiO_2$—N nanoparticles deriving from the suspension of the invention and also comprises a substrate or air or water filter coated according to the present invention.

In one embodiment, the device that is partially or entirely coated with $TiO_2$—N nanoparticles deriving from the suspension of the invention and comprising a source of UV or visible light and/or a coated substrate or filter is a lighting system.

Said lighting system comprises a support for one or more lighting elements having inner and/or outer light diffusing surfaces, characterised in that the aforesaid inner and/or outer surfaces are partially or entirely coated with the suspension of nanoparticles of the present invention.

Said lighting system can also be integrated with a ventilation and/or air distribution system which favours the distribution of the polluting agents and favours the contact thereof with the active surface of the photocatalyst.

In one embodiment said lighting system is a LED panel or a projector comprising a screen partially or entirely coated with the $TiO_2$—N nanoparticles deriving from the suspension of the invention, or a light bulb or a decorating object, such as a ceiling light fixture, a lamp (fixed or mobile) or a chandelier, whose light diffusing surface is likewise partially or entirely coated by the aforesaid nanoparticles.

In one embodiment, said lighting system comprises a plurality of lighting elements (for example LEDs) arranged in a chain-like succession, and which have inner and/or outer light diffusing surfaces partially or entirely coated with the $TiO_2$—N nanoparticles deriving from the suspension of the invention.

In one embodiment, light diffusing screens are present in a position below or above the aforesaid chain of lighting elements; said screens are partially or entirely coated with the suspension of the invention.

The lighting system partially or entirely coated with the suspension of the invention is activated by irradiation with visible or UV light when the device is switched on. Irradiation with visible or UV light triggers the activation of the photocatalytic properties of the $TiO_2$—N nanoparticles of the invention, thus bringing about the oxidation of organic contaminants of the air (e.g. $NO_x$, VOCs and VOSs, bacteria, moulds or odours) and contributing concretely to the decontamination of the environment.

In the embodiment wherein the $TiO_2$—N suspension also contains one or more biocidal agents, preferably selected from among silver and/or ZnO and/or Cu, the device will retain antibacterial (and therefore, in this case, air purifying) properties even when the light source is switched off.

EXAMPLES

EXAMPLE 1: 806.0 g of dibasic ammonium citrate are added to 19194.00 g of an aqueous suspension containing 6% titanium dioxide (PH000025), obtained by synthesis as described in document WO2007088151, in a 20 L reactor, under stirring and at room temperature. After 24 hours of mixing, the formation of a white suspension containing 0.498% nitrogen and 5.76% $TiO_2$ (which corresponds to 8.6% by weight of nitrogen relative to the $TiO_2$) is observed. The size of the nanoparticles in the suspension obtained was evaluated by DLS (dynamic light scattering, Malvern Instruments) measurements and a $Z_{average}$ value (which corresponds to the hydrodynamic diameter $D_z$, hence to the particle size) of 49.9 nm was obtained, with a polydispersity index (PdI) of 0.221.

EXAMPLE 2: The suspension obtained as per example 1 is then dried using the spray drying technique (Buchi Mini Spray Dryer B-290) with a temperature Tinlet of 130° C.

A dry powder is thus obtained; its particle size was determined by means of a dry dispersion laser diffraction measurement (Sympatec dry dispersion laser, model HELOS (H0969)). The analysis is shown in FIG. 1. The powder obtained is very fine with x99=14.21 µm (value indicating that 99% of the powder particles have a size smaller than 14.21 µm) and has good flowability.

Figure 2:
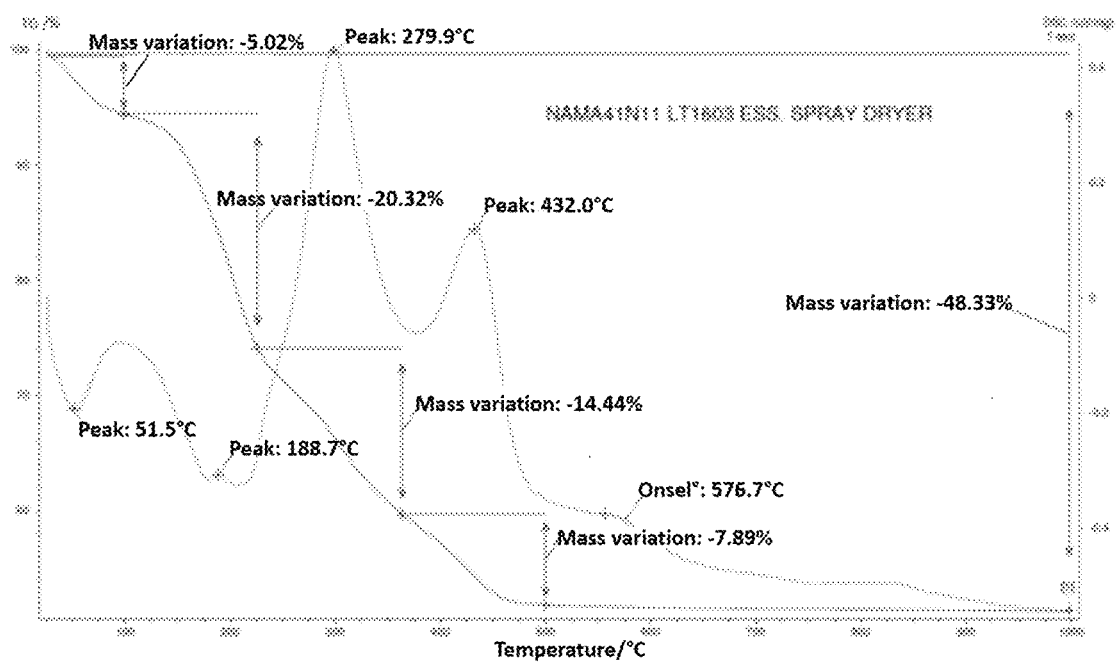
FIG. 2: DSC graph of the powder sample of example 2 obtained by drying with the spray-drying technique, before calcination.

A DSC thermogravimetric analysis (FIG. 2) was also performed; it showed a loss of mass at low temperatures (−5.02% at 100° C.) due to the loss of residual water in the powder. This analysis also made it possible to identify the correct calcination temperature of the dried powder for the subsequent step: said temperature is comprised between 450 and 500° C.

Figure 3:
FIG. 3: Photo of the calcined powder of example 2 in a stoneware oven dish.
Figure 4:
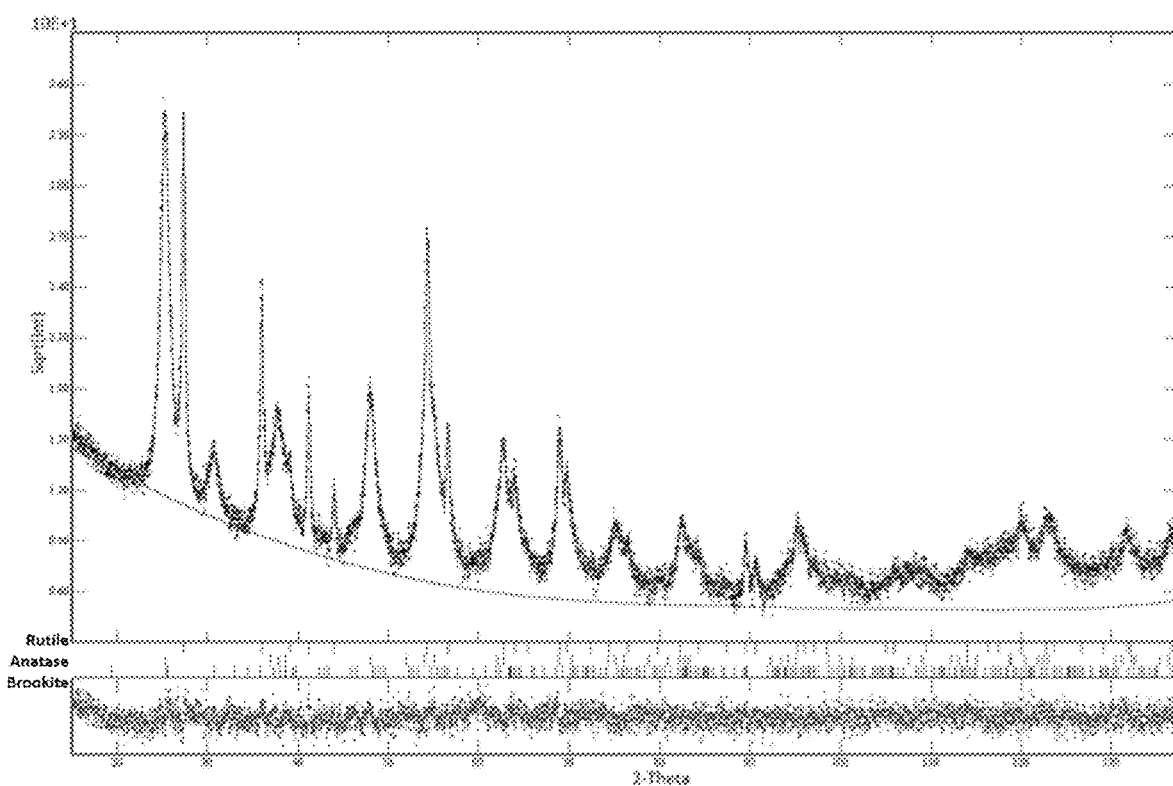
FIG. 4: Diffractogram of the calcined powder as per example 2.

400 g of dried powder were placed in a 41×26×6 cm refractory vessel (FIG. 3). Calcination was carried out by means of an electric muffle furnace equipped with a programmer (Nabertherm model LH60/14). The thermal cycle was the following: a first step consisting of a heating ramp from room temperature to 450° C. in 2 hours with a gradient of 7° C./min., followed by a second step at 450° C. with a dwell time of 1 hour. The recorded weight loss was 45% by weight. A diffractometric analysis was performed on the powder obtained after calcination (indicated as calcined powder) using an X-ray diffractometer (X-pert pro Panalytical), as shown in FIG. 4. The diffractometric analysis performed was a quantitative analysis using the Rietveld refinement method with a determination of the percentages of crystalline phases and crystal size. The sample shows the following diffractometric concentration of $TiO_2$.

| Crystalline phase | % by weight | Crystal size (nm) |
| --- | --- | --- |
| Anatase | 43 | 8.0 |
| Rutile | 37 | 24.3 |
| Brookite | 20 | 7.3 |

A photoreactor analysis was also performed on said powder sample in order to assess its photocatalytic efficiency. A dispersion of 5% by weight of the powder in water was prepared for the analysis; said dispersion was then deposited on a 10×10 cm glass substrate (corresponding to a deposition of dry product of 0.15 g). 3000K LEDs (colour temperature) and blue LEDs were used as the light sources. The trend in the abatement of pollutants (NO, $NO_x$ and $NO_2$) was then assessed by measuring the concentration (expressed in ppbv) as a function of time following irradiation with 3000K LEDs and with blue LEDs.

Figure 5:
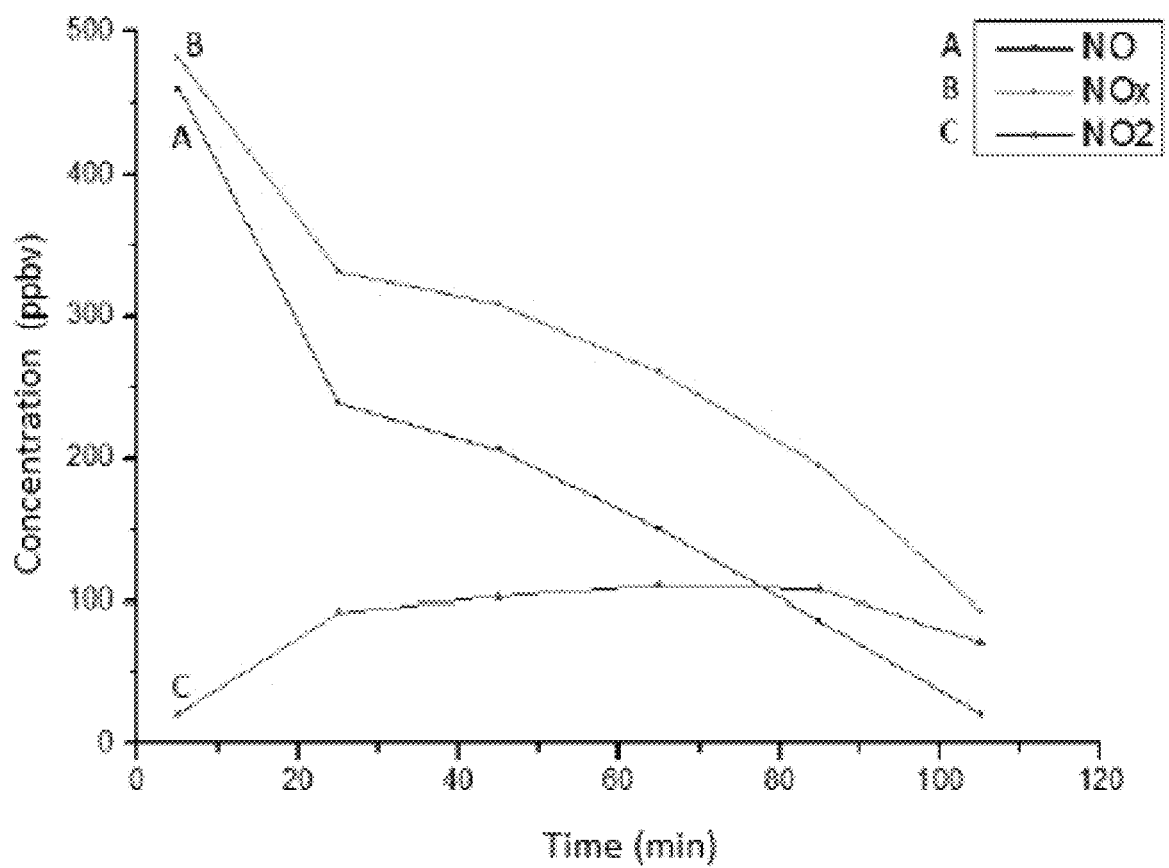
FIG. 5: Graph showing the trend in the abatement of pollutants by irradiation, with a 3000K LED, of the calcined powder obtained as per example 2.
Figure 6:
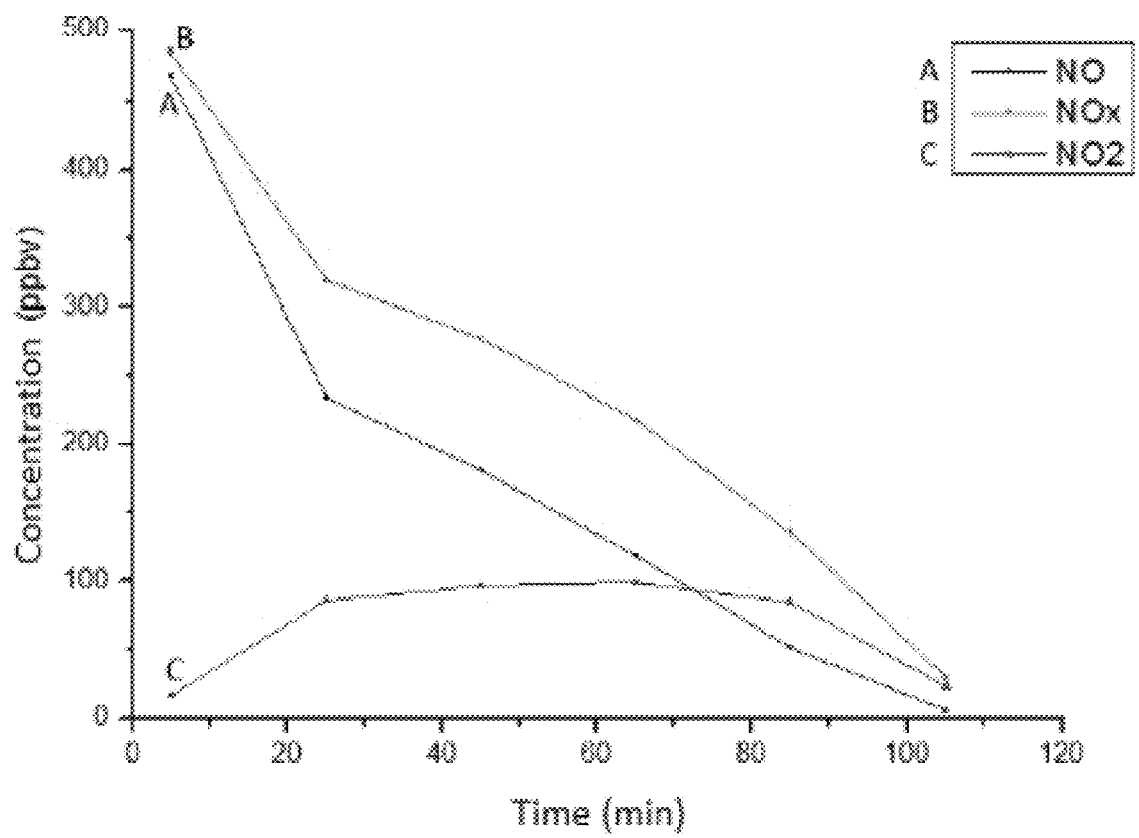
FIG. 6: Graph showing the trend in the abatement of pollutants by irradiation, with a blue LED, of the calcined powder obtained as per example 2.

The results are shown respectively in FIG. 5 and in FIG. 6.

Finally, the calcined powder was subjected to grinding with a high energy ball mill (E-Max Retzsch) in 99% ethanol at a speed of 1400 rpm for 80 minutes. The final product obtained is a suspension of monodisperse nanoparticles with a size of about 90 nm, a polydispersity index of less than 0.2 and a $TiO_2$—N concentration equal to about 20% by weight.

Figure 7:
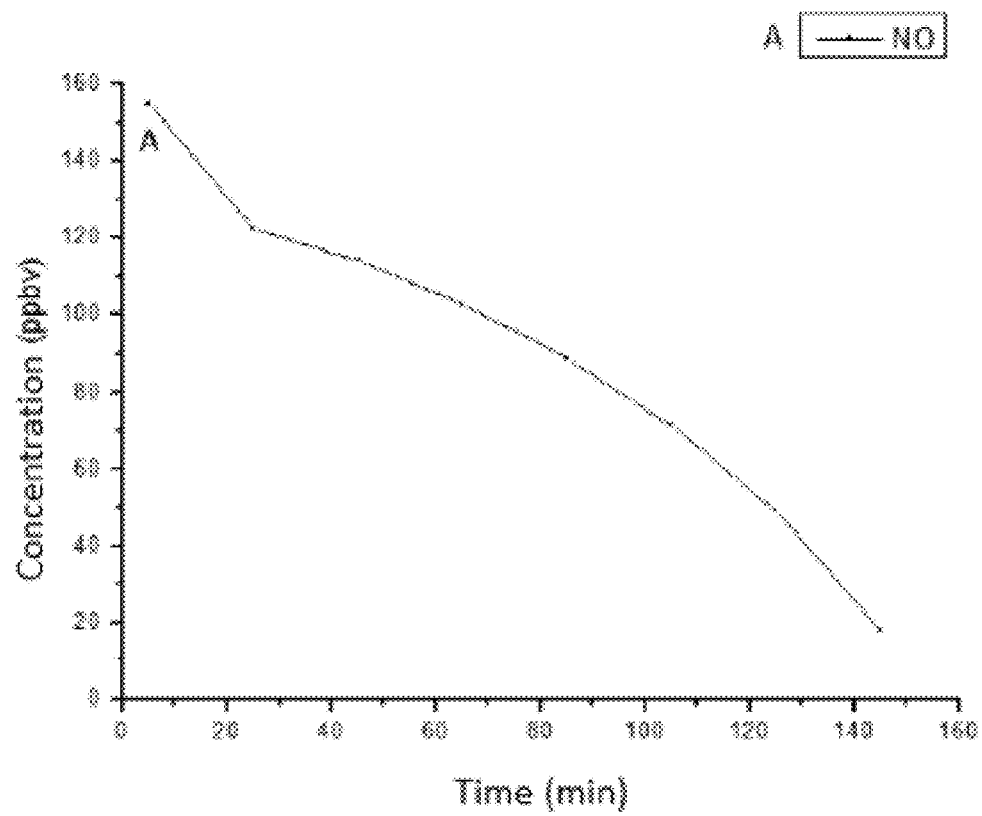
FIG. 7: Graph showing the trend in the abatement of pollutants by irradiation, with a 3000K LED, of the sample prepared as per example 3.

EXAMPLE 3: The product obtained as per example 2 was diluted with 96% ethanol in order to obtain a final concentration of $TiO_2$—N equal to 1% by weight. It was then applied by means of a spray-gun onto a 10×10 cm polymeric substrate of PMMA. A pollutant (NOx) abatement test was performed with the sample thus prepared, making use of a photoreactor with integrated chemiluminescence, shown in FIG. 7, using a 3000K LED as the light source.

Figure 8:
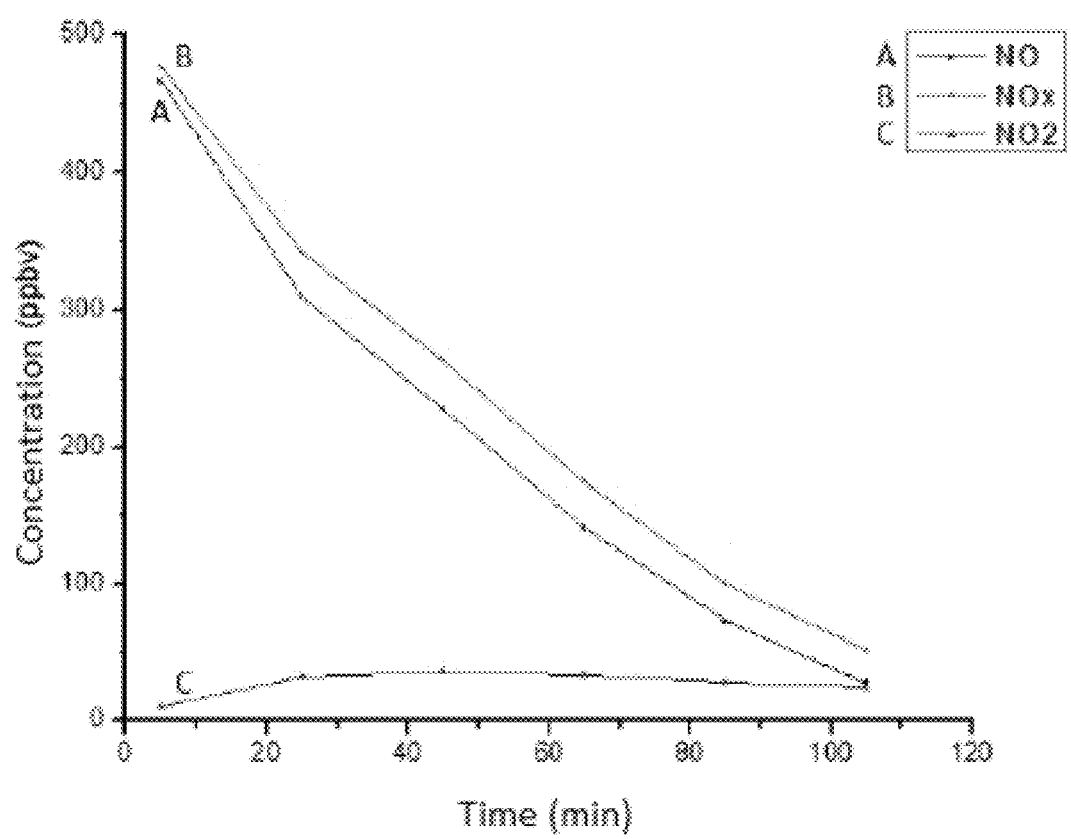
FIG. 8: Graph showing the trend in the abatement of pollutants by irradiation, with a COOL WHITE LED with a power of 25 W, of the sample prepared as per example 4.

Example 4: The product obtained as per example 2 was diluted with 96% ethanol in order to obtain a final concentration of $TiO_2$—N equal to 10% by weight. It was then applied by immersion onto a 8×8×2 cm cardboard substrate. A pollutant (NOx, $NO_x$, $NO_2$) abatement test was performed with the sample thus prepared, making use of a photoreactor with integrated chemiluminescence, as shown in FIG. 8, using a COOL WHITE LED with a power of 25 W as the light source.

EXAMPLE 5: 160.0 g of triethanolamine was added to 1000.00 g of an aqueous suspension containing 6% titanium dioxide (PH000025), obtained by synthesis as described by document WO2007088151, in a 5 L beaker under stirring at room temperature. After 4 hours of mixing, the formation of a white suspension containing 1.29% nitrogen and 5.17% $TiO_2$ (which corresponds to 24.95% by weight of nitrogen relative to the $TiO_2$) was observed.

EXAMPLE 6: The suspension obtained as per example 5 is allowed to settle and, once the supernatant has been separated from the precipitate, the latter is transferred into a drying tray and dried at 50° C. for 2 hours. The product obtained from the drying step is subjected to a calcination cycle in an electric muffle furnace equipped with a programmer (Nabertherm model LH60/14). The thermal cycle was the following: a first step consisting of a heating ramp from room temperature to 500° C. in 2 hours with a gradient of 5° C./min., followed by a second step at 500° C. with a dwell time of 1 hour. The recorded weight loss was 52% by weight.

Figure 9:
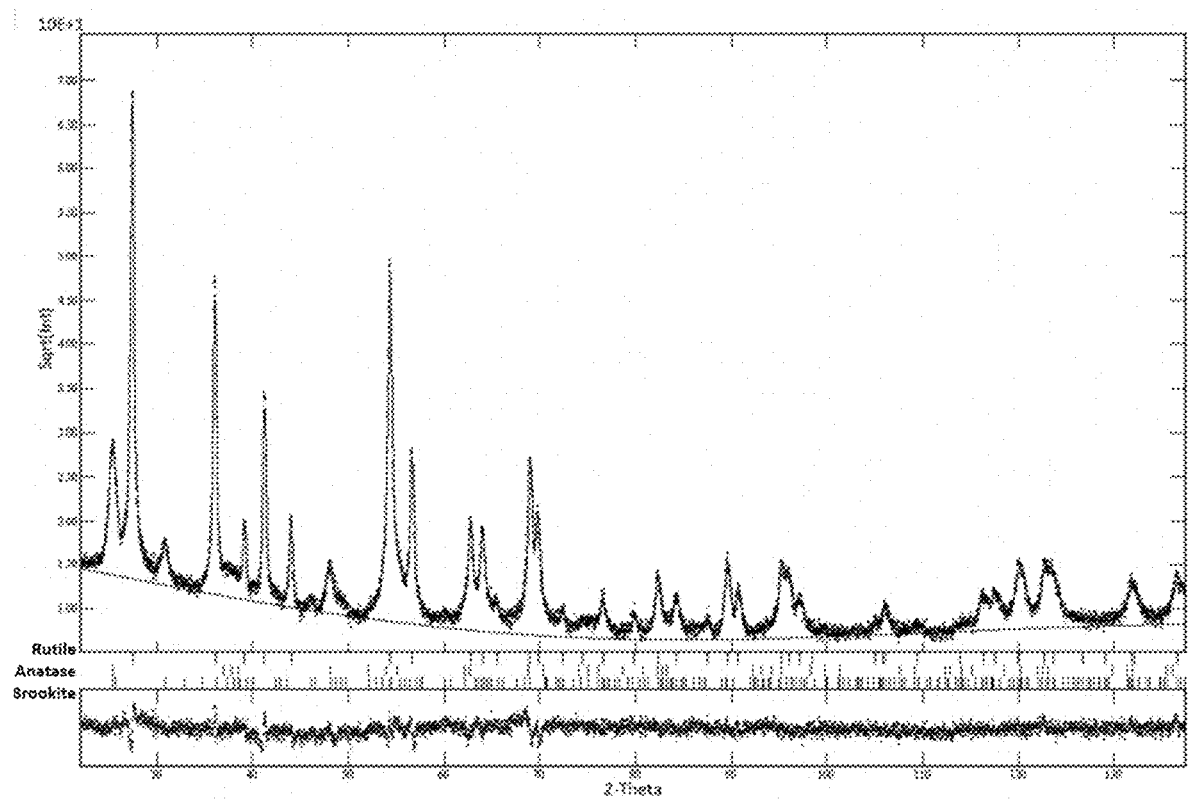
FIG. 9: Diffractogram of the calcined powder of example 6.

A diffractometric analysis was performed on the powder obtained after calcination (indicated as calcined powder) using an X-ray diffractometer (X-pert pro Panalytical), as shown in FIG. 9. The diffractometric analysis performed was a quantitative analysis using the Rietveld refinement method with a determination of the percentages of crystalline phases and crystal size. The sample shows the following diffractometric concentration of $TiO_2$.

| Crystalline phase | % by weight | Crystal size (nm) |
|---|---|---|
| Anatase | 8.2 | 9.9 |
| Rutile | 77.2 | 26.0 |
| Brookite | 14.5 | 8.4 |

An analysis was also performed on said powder sample, making use of a photoreactor with integrated chemiluminescence, in order to assess the photocatalytic efficiency thereof. A dispersion of 5% by weight of the calcined powder in water was prepared for the analysis; said dispersion was then deposited on a 10×10 cm fibre cement substrate (corresponding to a deposition of dry product of 0.15 g). A 3000K (colour temperature) LED was used as the light source. The trend in the abatement of pollutants (NO, $NO_x$ and $NO_2$) was then assessed, making use of a photoreactor with integrated chemiluminescence, by measuring the concentration (expressed in ppbv) as a function of time following irradiation with the 3000K LED.

Figure 10:
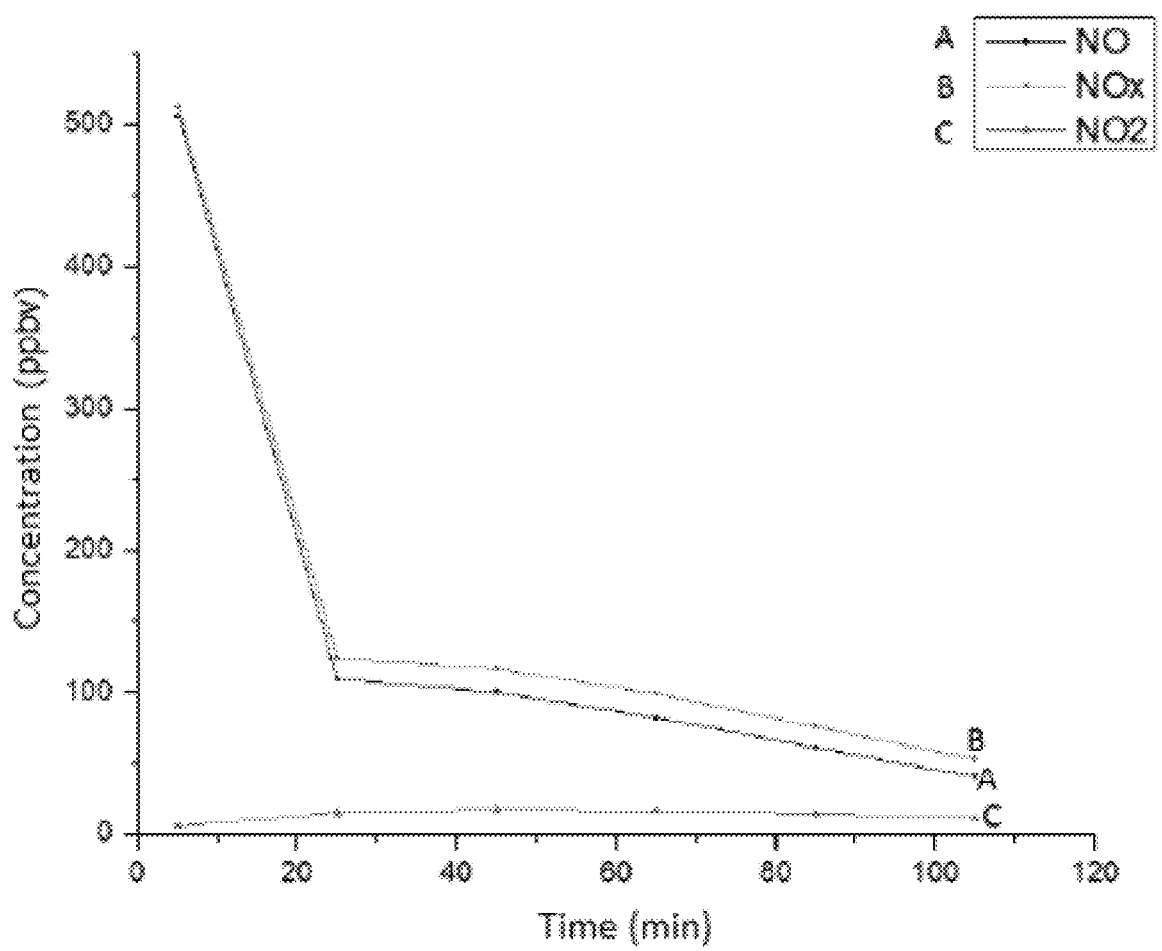
FIG. 10: Graph showing the trend in the abatement of pollutants by irradiation, with a 3000K LED, of the calcined powder obtained as per example 6.

The results are shown respectively in FIG. 10.

Figure 11:
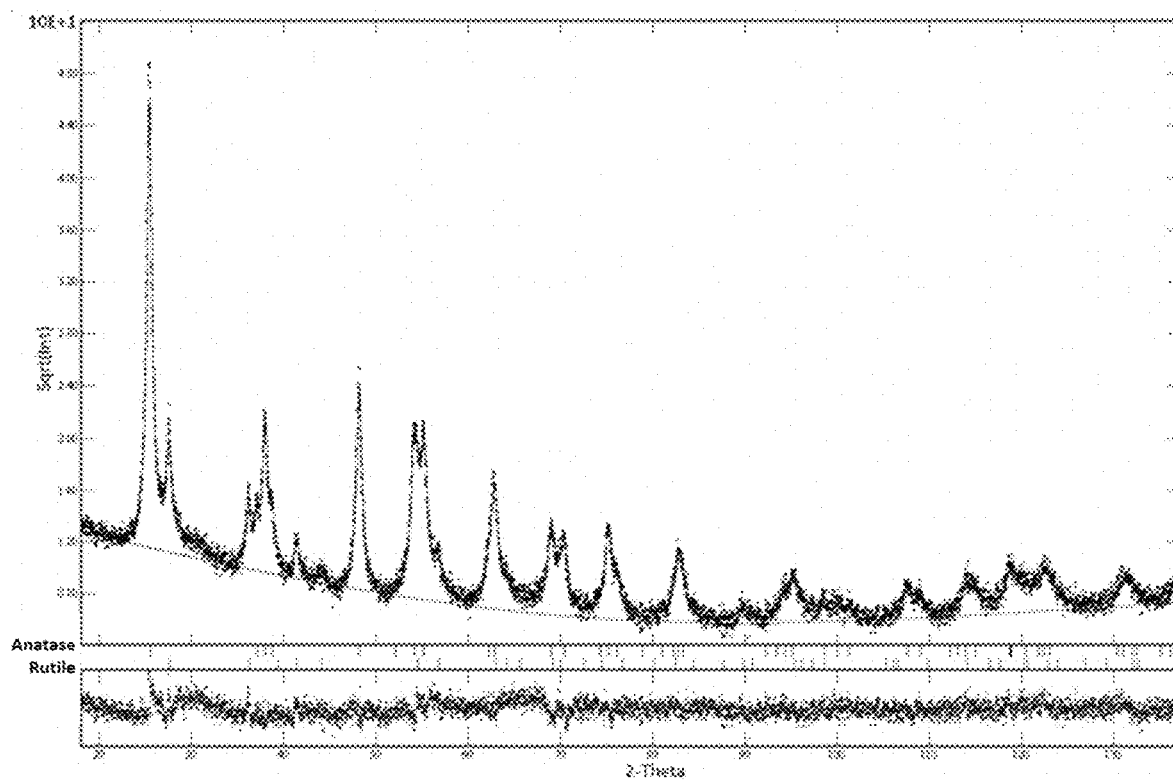
FIG. 11: Diffractogram of the calcined powder of commercial nitrogen-doped $TiO_2$ sold by the company TECNAN as per example 7.

EXAMPLE 7: A comparative diffractometric analysis was performed on a sample of calcined powder of nitrogen-doped $TiO_2$ sold by the company TECNAN. The diffractometric analysis, performed with an X-ray diffractometer (X-pert pro Panalytical), is shown in FIG. 11. The diffractometric analysis performed was a quantitative analysis using the Rietveld refinement method with a determination of the percentages of crystalline phases and crystal size. The sample shows the following diffractometric concentration of $TiO_2$.

| Crystalline phase | % by weight | Crystal size (nm) |
|---|---|---|
| Anatase | 78.1 | 11.8 |
| Rutile | 21.9 | 6.7 |
| Brookite | / | / |

It may be observed that in the case of the sample of calcined powder of TECNAN commercial nitrogen-doped $TiO_2$ there is no presence of the brookite crystalline phase, unlike in the case of the sample of calcined powder of the nitrogen-doped $TiO_2$ of the present invention. An analysis was also performed on said powder sample, making use of a photoreactor with integrated chemiluminescence, in order to assess its photocatalytic efficiency and compare it with that of the sample of the present invention as per example 6.

Figure 12:
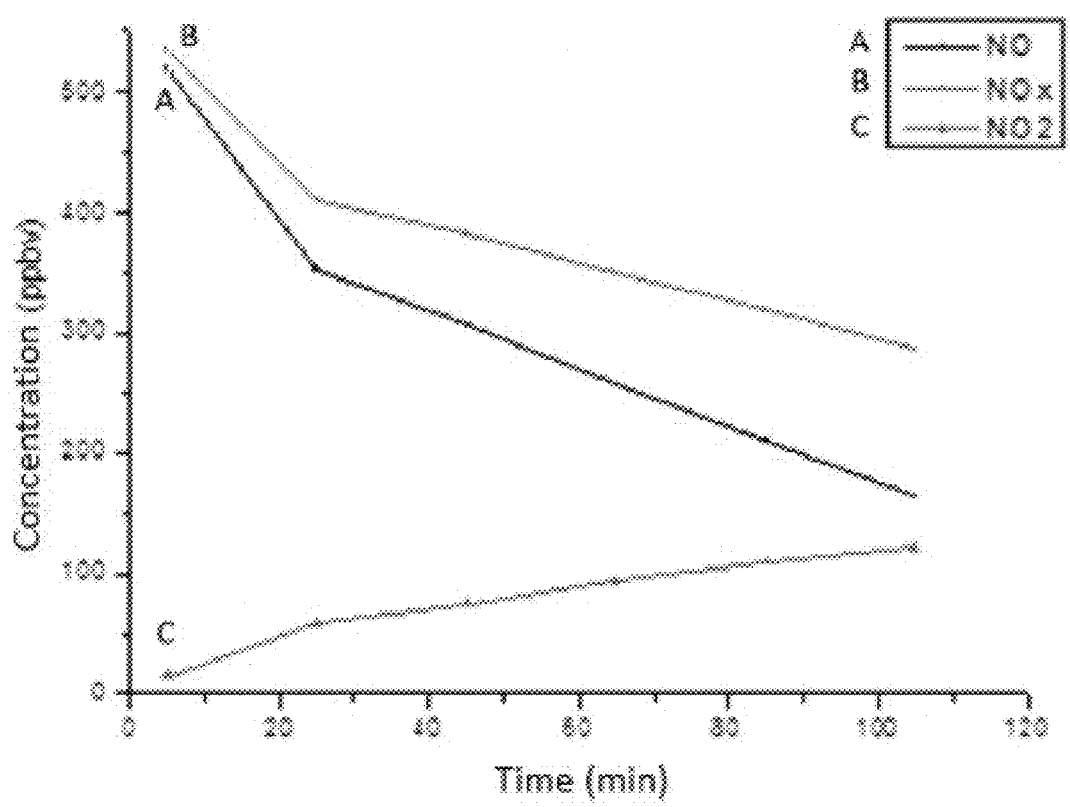
FIG. 12: Graph showing the trend in the abatement of pollutants by irradiation, with a 3000K LED, of the sample prepared with the suspension obtained from the calcined powder of commercial nitrogen-doped $TiO_2$ sold by the company TECNAN as per example 7.

A dispersion of 5% by weight of the calcined powder of TECNAN commercial nitrogen-doped $TiO_2$ in water was prepared for the analysis; said dispersion was then deposited on a 10×10 cm fibre cement substrate (corresponding to a deposition of dry product of 0.15 g). A 3000K (colour temperature) LED was used as the light source. Under the same conditions as in example 6, the trend in the abatement of pollutants (NO, $NO_x$ and $NO_2$) was then assessed, making use of a photoreactor with integrated chemiluminescence, by measuring the concentration (expressed in ppbv) as a function of time following irradiation with the 3000K LED. The result of the analysis is shown in FIG. 12. FIG. 10 shows the trend in the abatement of pollutants, by irradiation with a 3000K LED, of a substrate coated with the suspension of the calcined powder of $TiO_2$—N of the present invention. By then comparing the graph in FIG. 10 with the analysis in FIG. 12, it is possible to note the distinctly superior effectiveness of the coating made with the suspension of the calcined powder of $TiO_2$—N of the present invention (which is a suspension of $TiO_2$—N nanoparticles) compared to the one made with the suspension of calcined powder of TECNAN nitrogen-doped $TiO_2$. In fact, in the case of the analysis on the substrate coated with the suspension of calcined powder of TECNAN nitrogen-doped $TiO_2$, after 60 minutes of irradiation the concentration of NO goes from about 510 to about 290 ppm, that of $NO_x$ from about 520 to about 390 ppbv and that of $NO_2$ from about 10 to about 80 ppbv, whereas in the case of the analysis on the substrate coated with the suspension of $TiO_2$—N nanoparticles of the present invention, after 60 minutes of irradiation, the concentration of NO goes from about 500 to about 90 ppbv, that of $NO_x$ from about 510 to about 110 ppbv and that of $NO_2$ remains substantially unchanged at values of less than 20 ppbv. Therefore, the analysis conditions, substrate and pollutants being equal, the $TiO_2$—N nanoparticles of the present invention show a decidedly better effectiveness in abating pollutants (about double in the case of the abatement of NO and about three times as high in the case of the abatement of $NO_x$) compared to the effectiveness of TECNAN nitrogen-doped $TiO_2$.

EXAMPLE 8: An XPS (X-ray photoelectron spectroscopy) analysis was performed on the sample obtained as per example 2 in order to determine the actual presence, within the $TiO_2$ lattice, of photoactive catalytic centres in the visible region. The spectrum thus obtained was therefore compared with the XPS spectrum analysis performed on a sample of $TiO_2$—N obtained as described in the article by P.A.K. Reddy et al., Journal of Industrial and Engineering Chemistry 53 (2017) 253-260, said sample (NTU-2.5) being characterised by the following percentages of crystalline phases:

| Crystalline phase | % by weight |
|---|---|
| Anatase | 69 |
| Rutile | 14 |
| Brookite | 17 |

Figure 13:
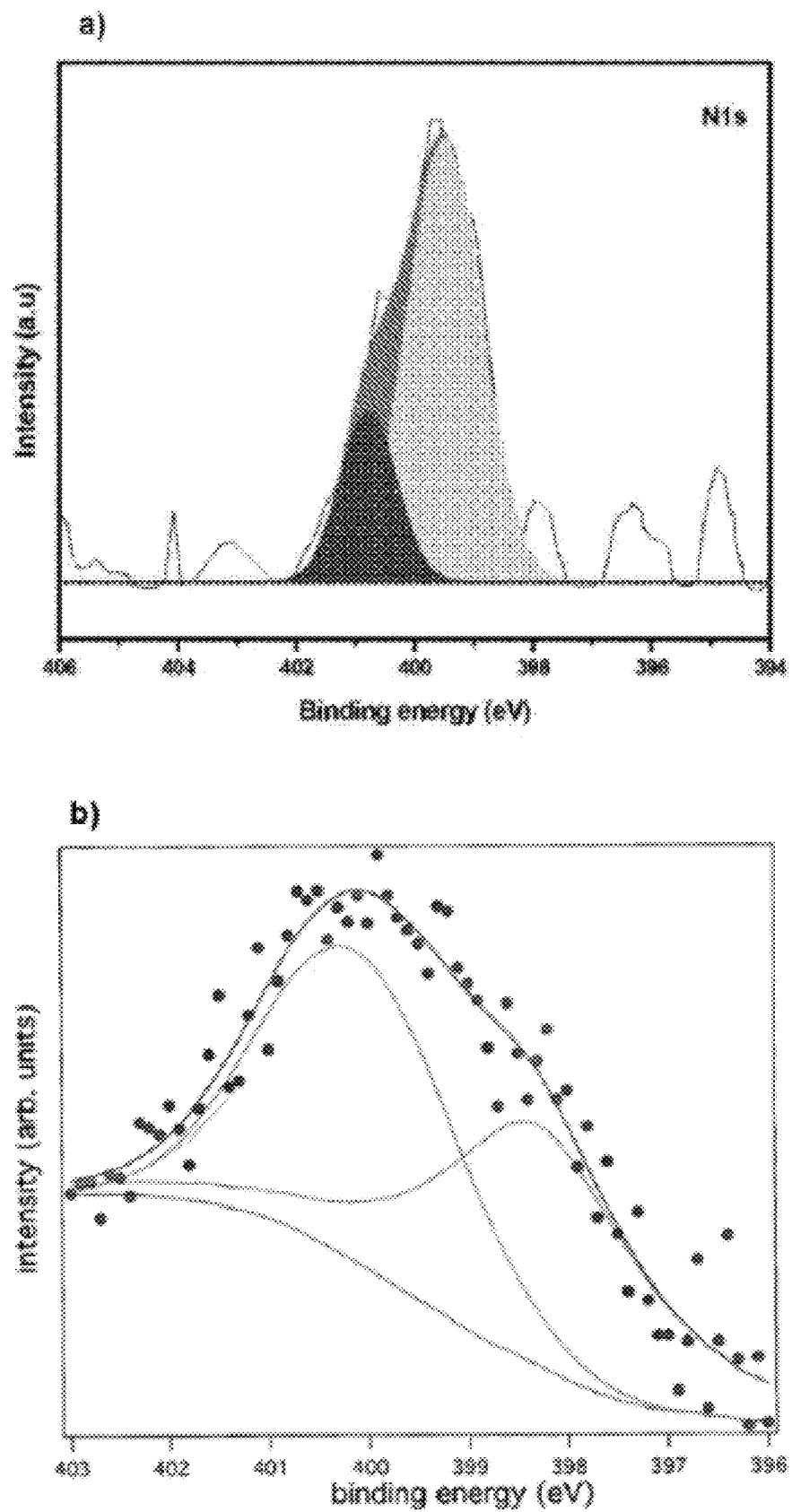
FIG. 13: XPS spectra respectively of the sample NTU-2.5 described by P.A.K. Reddy et al., Journal of Industrial and Engineering Chemistry 53 (2017) 253-260, as per example 8 (FIG. 13*a*) and of the sample according to the present invention prepared as per example 2 (FIG. 13*b*).

From a comparison between the two spectra (FIG. 13) it may be seen that there is a non-negligible difference between them, also considering the high selectivity of the spectroscopic method used. In the case of the XPS spectrum obtained for the sample of P.A.K. Reddy et al., shown in FIG. 13a, it may be observed that there is a prevalence of high B.E. systems (signal N1s at 401 eV) which have nothing to do with the photoactivity in the visible region and are due, at least in part, to surface ammoniac fragments. In the case of the spectrum analysis performed on the sample of the present invention, shown in FIG. 13b, it may be noted, by contrast, that there is a larger abundance of low B.E. centres (i.e. photoactive centres in the visible region); in particular 51% of centres with a B.E. around 398.3 eV and 49% around 400.2 eV.

Without wishing to be bound to any theory, it is possible to argue that the different presence of photoactive centres in the visible region can be attributed to the nature of the nitrogen doping, that is, to the manner (interstitial or substitutional) in which the nitrogen deriving from the nitrogen-containing doping agent interacts with the crystalline lattice of the $TiO_2$, and to the type of bonds that may have formed within that lattice (for example O—Ti—N or Ti—O—N bonds). These differences in the doping are attributable to various factors; standing out among them, in particular, is the % crystalline composition of the $TiO_2$ lattice, which contributes substantially, as also demonstrated precisely by the comparison between the two XPS spectra, to the actual presence of centres deriving from the doping which are photoactive in the visible region.

The invention claimed is:

1. A suspension of nitrogen-doped $TiO_2$ ($TiO_2$—N) nanoparticles in an organic and/or aqueous solvent, wherein the $TiO_2$—N nanoparticles comprise at least a brookite crystalline phase in an amount of 10 to 75% by weight relative to the weight of the nanoparticles, a rutile crystalline phase in an amount of 25 to 90% by weight relative to the weight of the nanoparticles,
wherein said $TiO_2$—N nanoparticles further comprise an anatase crystalline phase,
wherein said anatase crystalline phase is in an amount of 1 to 10% by weight, relative to the weight of the nanoparticles, and
wherein the combined amount of the brookite crystalline phase, rutile crystalline phase and anatase crystalline phase do not exceed 100%.

2. The suspension of nanoparticles according to claim 1, wherein the $TiO_2$—N nanoparticles have a nitrogen doping content comprised between 1 and 5% by weight, relative to the weight of the nanoparticles.

3. The suspension of nanoparticles according to claim 1, comprising at least one biocidal agent selected from the group consisting of a silver salt or silver nanoparticles, ZnO nanoparticles, a copper salt or copper nanoparticles, and mixtures thereof.

4. $TiO_2$—N nanoparticles obtainable by deposition, on a substrate, of the suspension of nanoparticles according to claim 1 and elimination of the solvent.

5. A substrate coated with the $TiO_2$—N nanoparticles according to claim 4, wherein said substrate is a filter for air or water purification.

6. A device for the abatement of air or water polluting agents, or a lighting system, entirely or partially coated with the $TiO_2$—N nanoparticles according to claim 4, said device comprising a source of UV and/or visible light and, optionally, a substrate coated with the $TiO_2$—N nanoparticles according to claim 4.

7. The device according to claim 6, wherein said lighting system is selected from the group consisting of a LED panel, a projector, a light bulb or a decorating object, a lamp, and a chandelier, and comprises a support for one or more lighting elements, which may or may not be organized in a chain-like succession, wherein said lighting elements have inner and/or outer light diffusing surfaces and a ventilation and/or air distribution system.

8. A process for preparing a suspension of nitrogen-doped $TiO_2$ ($TiO_2$—N) nanoparticles according to claim 1 comprising the steps of:
a) preparing a suspension of $TiO_2$ nanoparticles in water;
b) adding a nitrogen-containing doping agent to the suspension and mixing until homogeneous;
c) drying the suspension to which the nitrogen-containing doping agent was added until obtaining a powder with an aqueous residue comprised between 0 and 15% by weight;
d) subjecting the dried powder to calcination at a temperature between 400 and 600° C., thereby obtaining a calcined powder;
e) subjecting the calcined powder to grinding in an organic and/or aqueous solvent, thereby obtaining a suspension of $TiO_2$—N nanoparticles in solvent;
f) diluting the suspension of step e) with additional solvent.

9. The process according to claim 8, wherein the suspension of $TiO_2$ nanoparticles in water of step a) is a suspension of $TiO_2$ nanoparticles in anatase crystalline form.

10. The process according to claim 8, wherein in step b) the nitrogen-containing doping agent is selected between an inorganic ammonium salt and a nitrogen-containing organic compound.

11. The process according to claim 8, wherein:
the temperature of the drying step c) is between 100 and 150° C., and the drying is carried out for a time between 10 and 24 hours.

12. The process according to claim 8, wherein the calcination of step d) takes place at a temperature between 450 and 500° C. and for a time between 1 and 2 hours, with a ramp of 1 or 2 hours, wherein the heating gradient may be between 7 and 14° C./minute.

13. The process according to claim 8, wherein in step e) the grinding takes place at a speed between 1000 and 2000 rpm for a time between 30 and 120 minutes.

14. The process according to claim 8, wherein the solvent employed in steps e) and f) is selected from ethyl alcohol, acetone, water or mixtures thereof.

15. The process according to claim 8, wherein during step f) at least one biocidal agent selected from the group consisting of a silver salt or silver nanoparticles, ZnO nanoparticles, a copper salt or copper nanoparticles, and mixtures thereof, is added to the suspension.

16. A process for preparing a calcined powder of nitrogen-doped $TiO_2$ ($TiO_2$—N) comprising steps a) to d) according to claim 8.

17. A calcined powder of $TiO_2$—N obtainable with the process according to claim 16, wherein $TiO_2$—N comprises at least a brookite crystalline phase in an amount of 10 to 75% by weight relative to the weight of the powder and a rutile crystalline phase in an amount of 25 to 90% by weight relative to the weight of the powder,
wherein said $TiO_2$—N nanoparticles further comprise an anatase crystalline phase,
wherein said anatase crystalline phase is in an amount of 1 to 10% by weight, relative to the weight of the nanoparticles, and
wherein the combined amount of the brookite crystalline phase, rutile crystalline phase and anatase crystalline phase do not exceed 100%.

18. A method of decontaminating air or water comprising contacting the suspension of nanoparticles according to claim 1 with air or water wherein the suspension of nanoparticles is a UV and/or visible light-activated photocatalyst that removes organic contaminants from the air or water.

19. A method of coating a substrate with the suspension of nanoparticles according to claim 1 comprising coating the substrate with the suspension of nanoparticles where the substrate is plastic; textile; nonwoven, metallic, vitreous or ceramic substrate, wherein the plastic material is selected from the group consisting of PMMA (polymethylmethacrylate), PA (polyamide), PC (polycarbonate), PLA (polylactic acid), PET (polyethylene terephthalate), PE (polyethylene), PVC (polyvinyl chloride) and PS (polystyrene).

20. A suspension of nitrogen-doped $TiO_2$ ($TiO_2$—N) nanoparticles in an organic and/or aqueous solvent, wherein the $TiO_2$—N nanoparticles comprise at least a brookite crystalline phase in an amount of 10 to 75% by weight relative to the weight of the nanoparticles, a rutile crystalline phase in an amount of 25 to 90% by weight relative to the weight of the nanoparticles,
wherein said $TiO_2$—N nanoparticles further comprise an anatase crystalline phase,
wherein said anatase crystalline phase is in an amount of 25 to 90% by weight, relative to the weight of the nanoparticles, and
wherein the combined amount of the brookite crystalline phase, rutile crystalline phase and anatase crystalline phase do not exceed 100%.

* * * * *